J. E. HUNTER.
Corn Shock Binder.

No. 90,451.

Patented May 25, 1869.

Witnesses:
Geo. W. Mabee
Oscar Hinchman

Inventor:
J. E. Hunter
per Munn & Co.
Attorneys.

UNITED STATES PATENT OFFICE.

JOHN E. HUNTER, OF MECHANICSBURG, ASSIGNOR TO HIMSELF AND T. MARTIN, OF CATAWBA, OHIO.

IMPROVEMENT IN CORN-SHOCK BINDER.

Specification forming part of Letters Patent No. 90,451, dated May 25, 1869.

*To all whom it may concern:*

Be it known that I, JOHN E. HUNTER, of Mechanicsburg, in the county of Champaign and State of Ohio, have invented a new and useful Improvement in Corn-Shock Binder; and I do hereby declare that the following is a full, clear, and exact description thereof, which will enable others skilled in the art to make and use the same, reference being had to the accompanying drawing, forming part of this specification, in which—

Figure 1:
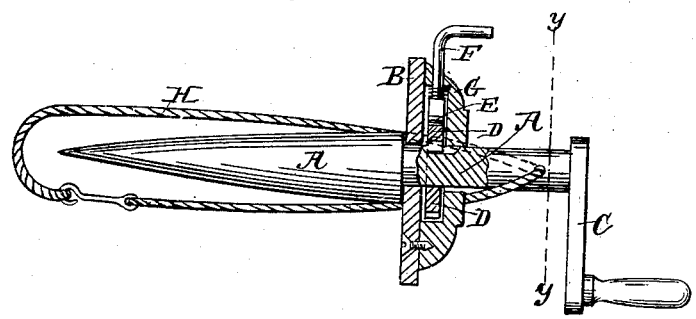
Figure 2:
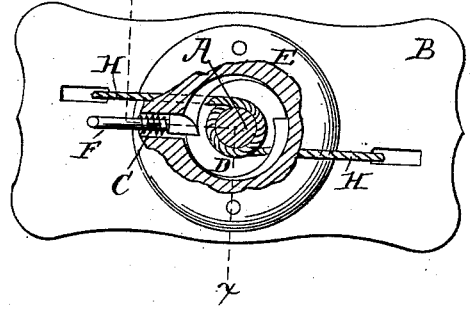

Figure 1 is a side view of my improved machine, partly in section, through the line $x\ x$, Fig. 2. Fig. 2 is a rear view of the same, partly in section, through the line $y\ y$, Fig. 1.

Similar letters of reference indicate corresponding parts.

My invention has for its object to furnish a simple and convenient machine for drawing the stalks of a corn-shock together to receive the band; and it consists in the construction and combination of various parts of the machine, as hereinafter more fully described.

A is the shaft, which is swiveled to a small plate, B. The forward end of the shaft is made pointed, so that it may be conveniently thrust into the shock of corn.

To the rear end of the shaft A is attached a crank, C, by means of which it may be conveniently turned. To the shaft A, upon the outer side of the plate B, is attached a wheel, D, having one or more ratchet-teeth or inclines formed upon its outer edge. The wheel D is protected and covered by a cap, E, attached to the plate B.

F is a bolt, placed in the recess in the cap E in such a position that its forward end may rest upon the edge of the wheel D. The bolt F is held forward against the wheel D by a spring, G, coiled around the bolt F, with one end resting against a shoulder of said bolt, and with its other end resting against a shoulder of the cap E, as shown in Fig. 1. The other end of the bolt F projects, and has a knob or handle formed upon or attached to its outer end for convenience in withdrawing it from the wheel D.

H is a cord attached to the outer part of the shaft A, and the ends of which are passed through holes or slots in the plate B upon opposite sides of the shaft A.

Upon one end of the cord H is formed a loop, or to it is attached an eye, into which hooks a hook, attached to the other end of said cord, as shown in Fig. 1.

In using the machine the pointed end of the shaft A is thrust into the shock of corn to be bound. The ends of the cord H are then passed around the shock, and are hooked together. The crank C is then turned, winding the cord H around the outer part of the shaft A until the shock has been drawn sufficiently tight, the bolt F holding the shaft from turning back, and holding the shock until the band has been put around it and tied. Then, by drawing out the bolt F to release the wheel D, the shaft A will be turned back sufficiently to loosen the cord H, which is then unhooked, and the machine removed from the shock and applied to another shock in the same manner.

Having thus described my invention, what I claim as new, and desire to secure by Letters Patent, is—

The ratchet-wheel D, spring-bolt F G, and cap E, in combination with the pointed crank-shaft A C, plate B, and cord H, substantially in the manner herein shown and described, and for the purpose set forth.

JOHN E. HUNTER.

Witnesses:
GEO. W. BUFFINGTON,
W. MARTIN.